United States Patent Office 3,616,811
Patented Nov. 2, 1971

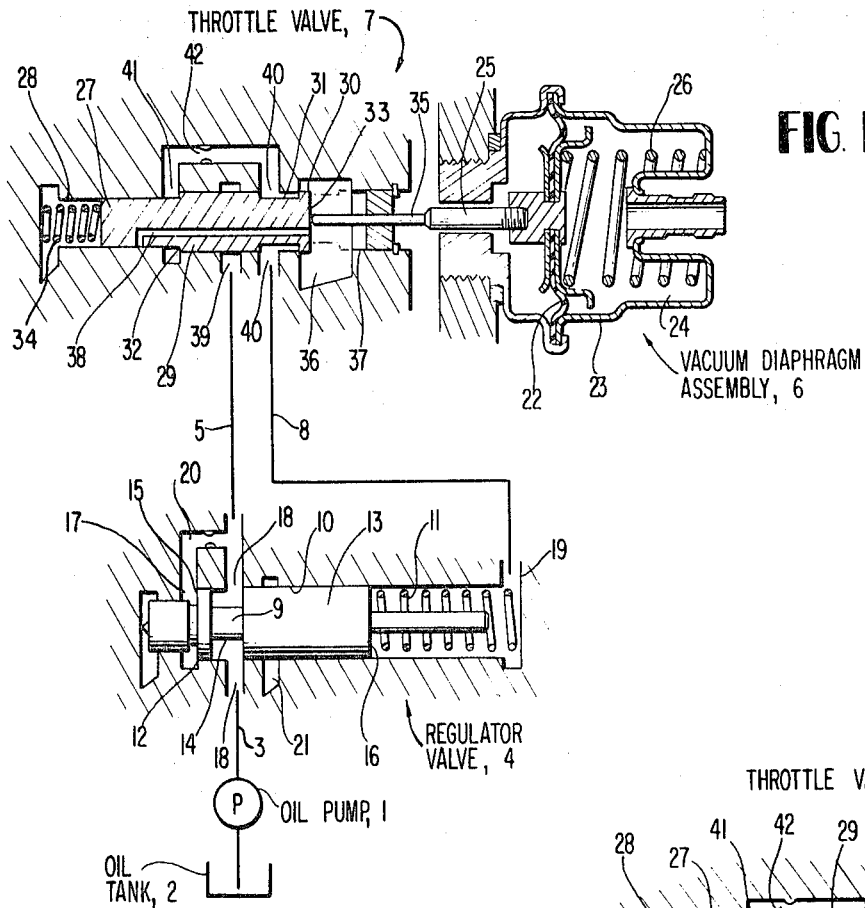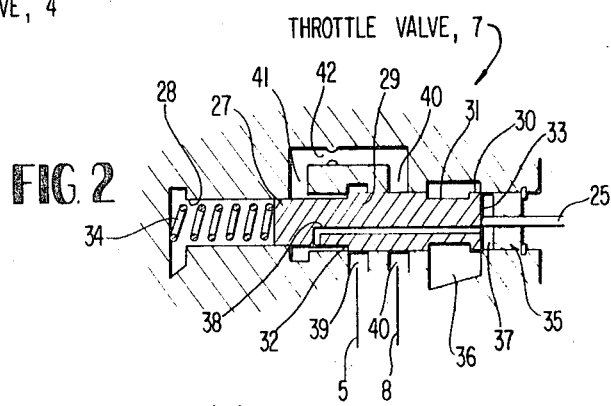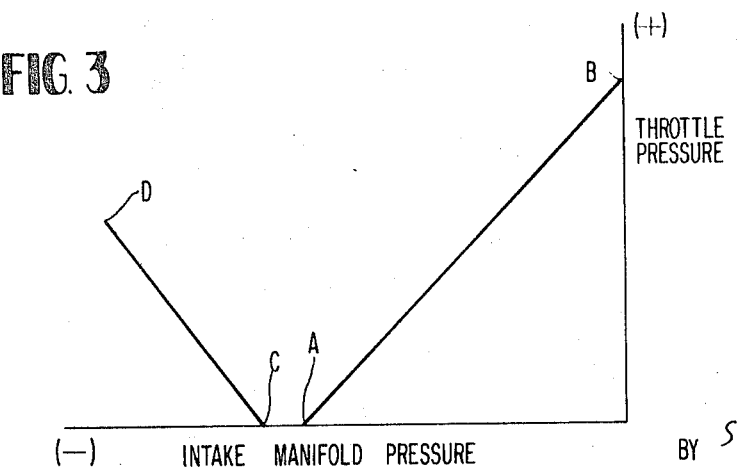

3,616,811
CONTROL SYSTEM FOR AN AUTOMATIC TRANSMISSION OF AN AUTOMOBILE
Tetsuo Shimosaki, Hiroshima, Japan, assignor to Toyo Kogyo Co., Ltd., Hiroshima, Japan
Filed Oct. 29, 1969, Ser. No. 872,324
Claims priority, application Japan, Oct. 29, 1968, 43/79,067
Int. Cl. G05d 16/00
U.S. Cl. 137—117       4 Claims

ABSTRACT OF THE DISCLOSURE

A control system for an automatic transmission of an automobile for controlling the line pressure in response to the increase of the torque transmitted from wheels and of engine torque having a throttle valve, a regulator valve for regulating the line pressure in response to the transmitting direction of the torque by detecting the intake manifold vacuum and applying the alternate throttle pressure to the regulator valve in accordance with the value of the intake manifold vacuum.

BACKGROUND OF THE INVENTION

This invention relates to control system for an automatic transmission of an automobile, and more particularly, to a novel control system for controlling the line pressure to be applied to friction elements such as clutches or brakes by varying the throttle pressure changing in response to the change of the intake manifold vacuum in response to the change of the transmitting direction of the torque.

In the conventional automatic transmission of this type, in order to reduce the shock and slip when the friction elements are engaged so that the pump loss be decreased, the line pressure is increased in response to the increase of the generated torque of the engine by applying the throttle pressure increasing in response to the increase of the intake manifold vacuum regulated by the throttle valve to the regulator valve.

However, since this type of control system controls the line pressure by detecting only the change of the torque transmitted from the engine, it does not properly control the transmission in response to varying conditions of the automotive vehicle. This means that the pressures required for determining the various shifting conditions of the automatic transmission elements, such as the clutches and brakes, correspond only to the change of the torque transmitted by the engine. If the line pressure is controlled merely by detecting the torque of the engine, the line pressure is insufficient in the state of engine braking, in which case the engine receives the torque from the wheels, so that the aforementioned slip occurs in the friction elements. On the other hand if the rising point of the line pressure is set considerably in high pressure corresponding to the required pressure in case of engine brake, the pump loss increases undesirably in the state of normal driving state in which the torque is transmitted from the engine.

SUMMARY OF THE INVENTION

This invention contemplates to eliminate the aforementioned disadvantages of the conventional control system for an automatic transmission of an automotive vehicle and provides a new and improved control system for the automatic transmission which comprises a throttle valve, a regulator valve for increasing the pressure in response to the increase of the torque generated in the engine and transmitted from the vehicle wheels, by varying the throttle pressure above the second set value of the manifold vacuum reversely with respect to the throttle pressure characteristic below the first set value of the manifold vacuum, after detecting the direction of transmitting torque by means of the intake manifold vacuum, whereupon applying said throttle pressure to the regulator valve.

Other features and advantages of the present invention will become apparent from the following description taken in conjunction with the accompanying drawings.

BRIEF DESCRIPTION OF DRAWINGS

FIG. 1 is a hydraulic pressure circuit diagram of a control system constructed in accordance with the present invention;

FIG. 2 is a partial sectional view of the main part of the control system shown in FIG. 1; and FIG. 3 is a graphical representation of the hydraulic pressure of the control system according to the present invention.

DETAILED DESCRIPTION OF THE INVENTION

Referring now to FIG. 1, which shows one example of the control system of this invention, the control system for the automatic transmission comprises an oil pump 1 for producing a hydraulic pressure from an oil tank 2 into a conduit 3. A pressure regulator valve 4 is connected to conduit 3 for regulating the output pressure of the oil supplied from the oil pump 1 through the conduit 3 to a predetermined pressure. This regulated hydraulic pressure is supplied as a line pressure to a conduit 5 connected to a throttle valve 7. Throttle valve 7 is operatively connected to a diaphragm assembly 6, which is in communication with the intake manifold of the automotive engine (not shown), and which moves in response to the intake manifold vacuum. Throttle valve 7, interlocked with the diaphragm assembly 6, acts to change the line pressure supplied from the conduit 5 to the throttle valve in response to the change of the intake manifold vacuum and to supply it to a conduit 8.

In this control system, the regulator valve 4 comprises a valve piston 9 slideably located in a cylinder 10 and urged by a spring 11 in a leftward direction, as seen in the drawing. Valve 9 has an annular groove 14 between lands 12 and 13. Surfaces 15 and 16 are provided on opposite sides of the lands 12 and 13, respectively, for receiving the line pressure and throttle pressure, respectively, so as to apply the pressure force to the piston 9. A port 17 communicates through a conduit 20 with the conduit 5, and an annular port 18 communicates with the conduits 3 and 5. Port 19 communicates with the conduit 8, while an exhaust port 21 acts to maintain the regulated pressure.

The diaphragm assembly 6 comprises a movable diaphragm 22 together with a casing 23 forming an operating chamber 24, within which diaphragm 22 may be displaced by the change of the intake manifold vacuum. A pressing rod 25 is fixed to the diaphragm 22 and projects against the throttle valve 7. A spring 26 is located within the operating chamber 24 for urging the pressing rod 25 in the leftward direction as seen in the drawing through the diaphragm 22 against the intake manifold vacuum.

The throttle valve 7 comprises a piston 27 slideably located in a cylinder 28 and having its right end abutting the left end of the pressing rod 25. Lands 29 and 30 are provided on piston 27 and an annular groove 31 is provided between the lands 29 and 30. Surfaces 32 and 33 are provided on opposite sides of the lands 29 and 30, respectively, for applying a pressing force in the rightward or leftward direction to the piston 27 under the control of the throttle pressure. A spring 34 acts to urge the piston 27 in the rightward direction as seen in the drawing. A stopper 35 fixed to the right end of the cylinder 28 is provided for slideably supporting the pressing rod 25 together with forming an oil pressure receiving chamber 37 when the piston 27 moves rightwardly in the drawing and the pressure receiving surface 33 is disposed rightwardly of the exhaust port 36. An oil passage 38 is provided in the piston 27, the rightmost end of which opens to the oil pressure receiving surface 33. A port 39 is communicated with the conduit 5, a port 40 is communicated with the conduit 8, and a port 41 is communicated with the port 40 through a conduit 42.

In operation of the above-described control system, the oil pressure is fed from the oil pump 1 intot he conduit 3. The oil within the conduit 3 is supplied to the pressure receiving surface 15 of the regulator valve 4 by way of conduit 20, and at the same time, to the port 39 of the throttle valve 7. When the engine is operating at an idling state, the intake manifold vacuum is at a first set value designated by point A in FIG. 3, the port 39 is closed by the piston 27 of the throttle valve 7. This is accomplished by the balancing of the pushing force of the spring 34 urging the piston 27 in the rightward direction as shown in the drawing with the pushing force of spring 26 in diaphragm assembly 6 for urging the piston 27 in the leftward direction of the drawing and, accordingly, the throttle pressure is not communicated with the conduit 8. Consequently, the line pressure within the conduit 5 is held in balance by the pushing force urging the piston 9 in the rightward direction of the drawing, this force being the line pressure operating on the pressure receiving surface 15 of the piston 9 of the regulator valve 4, and the pushing force of spring 11 for urging the piston 9 in the leftward direction of the drawing. Thus, if the line pressure within the conduit 5 rises above the set value, the pressing force of the line pressure acting on the pressure receiving surface 15 exceeds the pressing force of the spring 11 pushing the piston 9 in the leftward direction and, accordingly, the piston 9 moves rightwardly in the drawing and the excess oil pressure within the conduits 3 and 5 is exhausted through the port 18, annular groove 14 and oil exhaust port 21 to the oil tank 2, until the pushing force of the piston 9 in the rightward direction is decreased so that it is balanced with the pushing force of the spring 11 in the leftward direction. When the line pressure is decheased, the piston 9 moves in the leftward direction by the force of the spring 11 so that the communication between the port 18 and the exhaust port 21 is shut off and, accordingly, the line pressure again increases. Upon repetition of these steps, the line pressure is held in a constant value.

When the torque produced at the engine increases, the intake manifold vacuum decreases below the point A of FIG. 3 and the leftward pushing force of the diaphragm assembly 6 increases, the piston 27 is moved leftwardly against the force of the spring 34 so that the port 39 is communicated with the port 40, thereby causing part of the line pressure supplied from the conduit 5 to be supplied as a throttle pressure to the conduits 8 and 42. The throttle pressure within the conduit 8 is held in balance by the pushing force of the diaphragm assembly 6 urging the piston 27 in the leftward direction and the pushing force of the throttle pressure operating on the pressure receiving surface 32 and spring 34 for urging the piston 27 in the rightward direction, so that the throttle pressure increases along the line A–B in FIG. 3 in response to the increase of the generated torque of the engine or the reduction of the intake manifold vacuum. For this reason, the line pressure within the conduit 5 is now dependent on the balance between the pushing force of the line pressure operating on the pressure receiving surface 15 for urging the piston 9 in the rightward direction of the drawing and the pushing force of the spring 11 and the throttle pressure acting on the pressure receiving surface 16 for urging the piston 9 in the leftward direction, so that the line pressure is increased in response to the increase of the torque produced in the engine.

If the operation of the automobile changes from the state of normal travelling where the wheels are driven by the engine by depressing the accelerator pedal, into an engine braking condition, where the engine is driven by the wheels by releasing the accelerator pedal, such as on a descent down a hill, the intake manifold vacuum increases to a second set value or point C illustrated in FIG. 3, which is higher than the maximum point A in the normal travelling state of the engine. For this reason, the pushing force of the diaphragm assembly 6 for urging the piston 27 in the leftward direction of the drawing decreases to a value lower than the pushing force of the intake manifold vacuum at the point A so that the piston 27 moves rightwardly to the position as shown in FIG. 2. By this rightward moving of the piston 27, the port 39 communicates with the port 41 and at the same time it communicates with the pressure receiving chamber 37 through the oil passage 38, whereupon part of the line pressure within the conduit 5 is supplied to the port 41 through the port 39, and at the same time, through the oil passage 38 to the pressure receiving chamber 37, thus acting on the pressure receiving surfaces 32 and 33, respectively. Thus, part of the line pressure supplied through the port 39 acts as a throttle pressure to maintain the balance between the pushing force of the spring 34 and the oil pressure or throttle pressure acting on the pressure receiving surface 32 for pushing the piston 27 in the rightward direction, and the pushing force of the throttle pressure operating on the pressure receiving surface 33 and the diaphragm assembly 6 for pushing the piston 27 in the leftward direction, so that the line pressure is supplied to the conduit 8 through the port 41, conduit 42 and port 40.

Since the pressure receiving surface 32 has a smaller area than that of the pressure receiving surface 33, the net force of the throttle pressure acting on the pressure receiving surfaces 32 and 33 of piston 27 acts reversely of the aforementioned normal travelling state to move piston 27 in the leftward direction of the drawing. Thus, if the throttle pressure becomes higher than the set value, it moves the piston 27 in the leftward direction of the drawing and, accordingly, the pressure receiving chamber 37 is opened to the oil exhaust port 36 so that the throttle pressure is lowered to the set value. For this reason, when the intake manifold vacuum is above the point C illustrated in FIG. 3, the throttle pressure within the conduit 8 increases along the line C–D in FIG. 3 in response to the increase of the torque transmitted from the wheels and increase of the intake manifold vacuum. At the same time, the line pressure within the conduit 5 increases in response to the increase of the torque transmitted from the wheels or increase of the throttle pressure.

It is understood from the foregoing description that by detecting the transmitting direction of the torque by the value of the intake manifold vacuum operating on the throttle valve, the throttle pressure above the second set value of the intake manifold vacuum is varied inversely with respect to the throttle pressure characteristic below the first set intake manifold vacuum value, and, by communicating the throttle pressure with the regulator valve, the line pressure may be increased in response to the increase of the torque transmitted from the wheels and in response to the increase of the torque of the engine. Accordingly, the line pressure may be made to approach the approximate value of the required pressure for the friction elements such as clutches and brakes, so that the pump loss is reduced while at the same time the slip of the friction elements and the shock upon shifting may be completely eliminated.

What is caimed is:

1. A control system for an automatic transmission of an automobile comprising a source of fluid pressure for supplying a line pressure to said control system, a regulator valve for regulating the line pressure, a vacuum motor for providing a signal force decreasing in response to the increase of the intake manifold vacuum, and a throttle valve connected to said line pressure, said throttle valve including:
(a) a casing having a bore formed therein;
(b) an inlet port formed on said casing and connected to said regulator valve for supplying line pressure into said bore;
(c) a throttle pressure outlet port formed on said casing in communication with said bore;
(d) a valve piston disposed slidably within said bore;
(e) said valve piston being connected to said vacuum motor at one end;
(f) a first means for moving said valve piston against the signal force of said vacuum motor when said signal force is above a predetermined value; and
(g) a second means for moving said valve piston in the same direction as the signal force of said vacuum motor when said signal force is below a predetermined value, whereby said throttle pressure is increased in response to an increase of said signal force above a predetermined value of said signal force and also in response to the decrease of said signal force below said predetermined value of said signal force by movement of said valve piston.

2. A control system for an automatic transmission of an automobile comprising a source of fluid pressure for supplying a line pressure to said control system, a regulator valve for regulating the line pressure, a vacuum motor for providing a signal force decreasing in response to the increase of the intake manifold vacuum, and a throttle valve connected to said line pressure, said throttle valve including:
(a) a casing having a bore formed therein;
(b) a valve piston disposed slideably within said bore and having a land thereon;
(c) said valve piston being connected to said vacuum motor at one end;
(d) a first pressure receiving surface formed on said valve piston for moving said valve piston against the signal force of said vacuum motor when the oil pressure is communicated thereto;
(e) a second pressure receiving surface having a larger area than said first pressure receiving surface and formed on said valve piston for moving said valve piston in the same direction as the signal force of said vacuum when the oil pressure is communicated thereto;
(f) a spring for urging said valve piston against the signal force of said vacuum motor;
(g) an inlet port formed on said casing and connected to said source for supplying the fluid pressure into said bore;
(h) a plurality of outlet ports disposed on said casing and communicating with said bore, said valve piston operatively connecting said inlet port and one of said outlet ports for supplying the throttle pressure varying in response to the change of said signal force;
(i) a first outlet port being connected to said inlet port to increase the throttle pressure in response to the increase of said signal force above a predetermined value of said signal force; and
(j) a second outlet port being connected to said inlet port to increase the throttle pressure in response to the decrease of said signal force within said predetermined value of said signal force.

3. A control system for an automatic transmission of an automobile as claimed in claim 1, further comprising, conduit means communicating said throttle pressure outlet port of said throttle valve with said regulator valve for supplying throttle pressure to said regulator valve for increasing said line pressure in response to the increase of said throttle pressure.

4. A control system for an automatic transmission of an automobile as claimed in claim 2, further comprising passage means in said valve piston for communicating said first pressure receiving surface with said second pressure receiving surface to obtain a predetermined maximum throttle pressure when said second outlet port is connected to said inlet port.

References Cited
UNITED STATES PATENTS

| | | | |
|---|---|---|---|
| 3,136,328 | 6/1964 | Hipp | 137—117 |
| 3,258,984 | 7/1966 | Searles | 74—472 |
| 3,272,029 | 9/1966 | Duffy | 74—472 |
| 3,416,554 | 12/1968 | Liang | 137—116.3 |

LAVERNE D. GEIGER, Primary Examiner

W. H. WRIGHT, Assistant Examiner

U.S. Cl. X.R.
137—115, 116.5